Oct. 1, 1946.                    J. J. SEME                    2,408,689
                    CONCENTRICITY GAUGE SPECIMEN HOLDER
                           Filed May 8, 1944
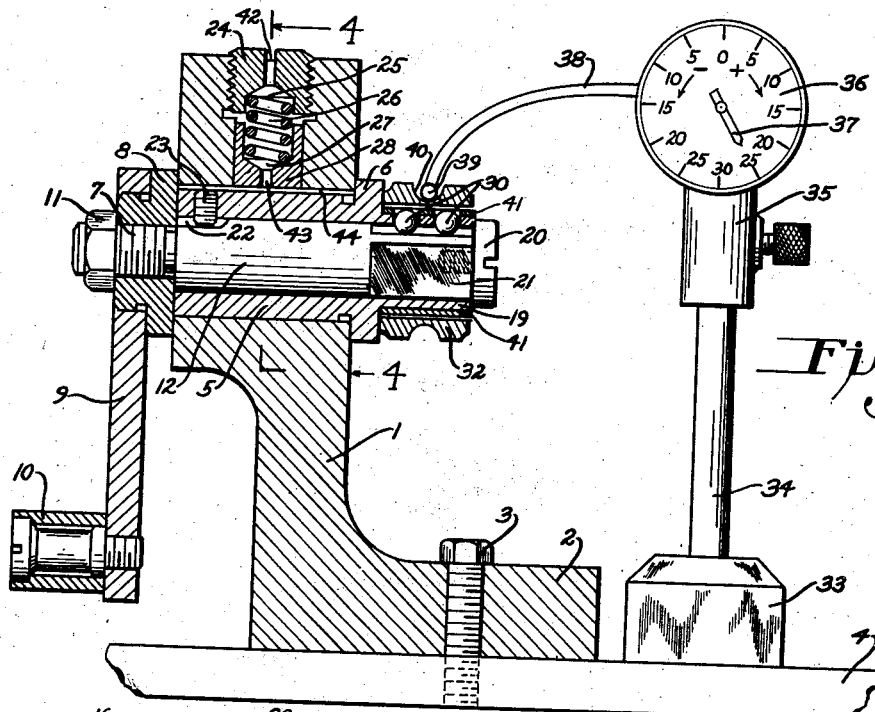
INVENTOR.
JOHN J. SEME
BY
Frank H. Harmon
ATTORNEY.

Patented Oct. 1, 1946

2,408,689

UNITED STATES PATENT OFFICE 2,408,689

CONCENTRICITY GAUGE SPECIMEN HOLDER

John J. Seme, Maple Heights, Ohio, assignor, by mesne assignments, to Jack & Heintz Precision Industries, Inc., Cleveland, Ohio, a corporation of Delaware Application May 8, 1944, Serial No. 534,664

5 Claims. (Cl. 279—1)

This invention relates in general to testing apparatus and more particularly to improvements in devices for holding specimens to be tested.

In the practice of testing the outer circumference of inner ball bearing races for concentricity by simple conventional surface engaging metering devices it is of importance to provide a device with means whereby the race may be readily engaged and quickly detached without interference to the meter and also rotated so as to completely meter the entire circumference of the race.

One of the primary objects of the invention therefore is to provide a simple, self-contained and efficient specimen holding and rotating device that when at rest is adapted to receive the ball race or permit its removal and when rotated will by positive expansion means positively engage and grip the interior of the race against removal.

In this manner no special holding means are employed which must be fastened or unfastened which would make for loss of time in operation.

To this end it is proposed to provide a rotatable shaft with an outer protruding multisided angular end portion, surrounding which is a circular retainer for balls that engage the sides of the end portion and are forced to protrude through the ball retainer to grip the interior surface of the race or are permitted to be withdrawn therefrom according to the adjusted relationship between the balls and the sides of the end portion of the shaft. The ball retainer in the end of the bushing is yieldingly maintained stationary and is provided with a set screw cooperating with a key way in the shaft providing lost motion so predeterminedly limited as to effect rotation of the bushing, as the shaft is manually rotated, at the same time the angular end portion of the shaft has forced the balls out through its retainer into gripping relationship with the race. As soon as rotation of the shaft has been discontinued the shaft is out of driving engagement with the bushing, the balls seek their lower retracted position and the race is free to be removed from its cylindrical holder, or the protruding end portion of the bushing.

With the foregoing and other objects in view, the invention resides in the combination of parts and in the details of construction hereinafter set forth in the following specification and appended claims, certain embodiments thereof being illustrated in the accompanying drawing, in which:

Figure 1 is a view in vertical longitudinal section taken through the specimen holding device and showing a metering device in conjunction therewith;

Figure 2 is an enlarged schematic sectional view showing the relationship between the specimen gripping balls, its retainer and the angular end portion of the operating shaft when the balls are in extended gripping position;

Figure 3 is a similar view showing the balls in retracted position; and

Figure 4 is a view in section taken along line 4—4 of Figure 1 showing the yielding resilient means for holding the rotatable bushing against rotation and also showing the lost motion key and slot drive between the shaft and the bushing.

Referring more particularly to the drawing, the specimen holder includes a standard 1 with a base plate 2 secured by bolts 3 to a stationary base 4. The standard is horizontally bored to rotatably receive a bushing 5 which is inserted from right to left as viewed in Figure 1 until its flange 6 abuts the standard. Rotatably fitted within the bushing is a shaft 12, screw threaded at 7 to receive a nut 8 on which is press fitted a crank 9 with a handle 10, the nut 8 being provided with a locking nut 11.

That portion 21 of the shaft 12 that protrudes to the right of the standard, as viewed in Figure 1, may be triangular in shape, as shown in Figures 2 and 3, to have three flat faces 13, 14 and 15 separated by three corners 16, 17 and 18. That portion 19 of the bushing 5 that extends past the right side of the standard is provided with two spaced sets of apertures to receive two sets of balls which bear on the triangular shaft while the apertures cage the balls. A correspondingly apertured band 41 with apertures slightly smaller than those of the bushing permit limited extension of the balls therethrough. A retaining screw 20 is screwed into the end of the shaft to overlap and retain the bushing with slight longitudinal clearance.

As shown in Figures 1 and 4, the shaft has a cutaway slot 22. Aligned with this slot is a set screw 23 carried by bushing 5 and arranged so as to permit free relative rotational movement between the bushing until the set screw reaches either limit of the slot, at which time rotation of the handle to rotate the shaft results in the rotation of the bushing. In order to insure that the shaft may rotate and not carry the bushing with it while the set screw is intermediate the ends of the slot, an adjustable screw plug 24 is provided in the standard with a recess 25 to receive one end of a compression spring 26 the other end of which engages a recess 27 of a slidable plunger 28 with an inner concave surface to engage the bushing. This assembly acts as a spring operated brake to hold the bushing against rotation until the set screw reaches the limit of its slot. Then when the rotation of the handle is continued the shaft and bushing rotate together. The plug 24 and plunger 28 are provided with oil holes 42 and 43 leading to a longitudinal V-groove 44 in the bushing 5 for lubricating the same in its rotation in the bore of the standard.

With the specimen holding device thus described assembled, the handle is released to be stationary, at which time both sets of balls 29, 30 and 31 will be in retracted position, as shown in Figure 3, engaging the sides 13, 14 and 15 intermediate corners 16 and 18, 16 and 17, and 17 and 18. This permits the specimen, such as an inner ball bearing race 32 to be slipped over the band 41 which is press fitted on the extension 19 of bushing 5 until the specimen abuts flange 6. By means above described, a turning of handle 10 in a clockwise direction rotates slot 22 so that its extremity is in such relationship with set screw 23 as to make the bushing rotate with the shaft. Simultaneously the balls 29, 30 and 31 have moved from their position on faces 13, 14 and 15, as shown in Figure 3, up to their respective inclines toward corners 18, 16 and 17, respectively, as shown in Figure 2, forcing the balls into extended positions to engage and grip the interior surface of the ball race 32 against removal. As stated before, a release of handle permits the balls to assume the positions shown in Figure 3 to become disengaged from the race so as to permit its ready removal.

The metering device for checking the concentricity of the ball race comprises a base plate 33 suitably secured to the base 4 and a standard 34 on which is adjustably mounted a sleeve 35 carrying a graduated scale 36 with a pointer 37 and a suitable metering device including a pivoted rod 38 with a ball 39 which is brought into engagement with the circumferential grooved raceway 40 of the race 32. The pointer is set at zero on the dial when meter ball is in engagement with raceway 40. If upon turning of handle 10 the pointer remains at zero during a complete revolution of the race, the raceway is concentric. Any deviation of the pointer from 0 indicates the lack of concentricity and the degree and location thereof.

It will thus be seen that there has been provided a specimen holder that grips the specimen while the holder is rotated for metering purposes and which automatically releases the specimen for removal and replacement upon discontinuance of its replacement. The engagement and release of the specimen involves nothing more than the manual operation of the handle for rotating the specimen holder for rotating the specimen in order to meter the concentricity thereof throughout its circumference.

I claim:

1. In a device for releasably retaining and rotating an inner ball bearing race so as to have its outer raceway in engagement with a metering gauge for measuring the concentricity of the raceway, a casing, a rotatable shaft and a bushing mounted thereon, an adjustable spring operated brake carried by the casing to bear against said bushing to normally hold it against rotation, a driving connection between said bushing and said shaft permitting a predetermined limited degree of lost motion therebetween, said bushing being adapted to slidably receive said ball race and having a ball containing cage, cam means on said shaft in engagement with said balls adapted upon manual rotation of said shaft to force said walls radially outwardly into gripping relationship with the interior surface of said ball race and rotate the same, and, upon release of manual rotation, to automatically permit retraction of said balls inwardly out of engagement with the ball race to permit its ready removal from said bushing.

2. In a device for releasably retaining and rotating specimens so as to be in engagement with a metering gauge for measuring the concentricity of the specimen, a casing, a rotatable shaft and a bushing mounted thereon, an adjustable spring operated brake carried by the casing to bear against said bushing to normally hold it against rotation, a driving connection between said bushing and said shaft permitting a predetermined limited degree of lost motion therebetween, said bushing having an extension adapted to slidably receive said specimen, radially expansible means carried by said bushing, cam means on said shaft in engagement with said expansible means adapted upon manual rotation of said shaft to expand said expansible means into gripping relationship with the interior surface of said specimen and rotate the same and upon release of manual rotation to automatically permit retraction of the expansible means out of engagement with the specimen to permit its ready removal from said bushing.

3. In a device for releasably retaining and rotating specimens so as to be in engagement with a metering gauge for measuring the concentricity of the specimen, a casing, a rotatable shaft and a bushing mounted thereon, an adjustable spring operated brake carried by the casing to bear against said bushing to normally hold it against rotation, a driving connection between said bushing and said shaft permitting a predetermined limited degree of lost motion therebetween, said bushing having an extension adapted to slidably receive said specimen and having apertures to receive balls therein to have limited radial movement therethrough, cam means on said shaft in engagement with said balls adapted upon manual rotation of said shaft to force said balls outwardly through said apertures into gripping relationship with the interior surface of said specimen and rotate the same and upon release of manual rotation to automatically permit inward retraction of said balls out of engagement with the specimen to permit its ready removal from said bushing.

4. In a device for releasably retaining and rotating specimens so as to be in engagement with a metering gauge for measuring the concentricity of the specimen, a casing, a rotatable shaft and a bushing mounted thereon, an adjustable spring operated brake carried by the casing to bear against said bushing to normally hold it against rotation, a driving connection between said bushing and said shaft including a key and an enlarged transverse slot permitting a predetermined limited degree of lost motion therebetween, said bushing having an extension adapted to slidably receive said specimen and having apertures to receive balls therein to have limited radial movement therethrough, cam means on said shaft in engagement with said balls adapted upon manual rotation of said shaft to force said balls outwardly through said apertures into gripping relationship with the interior surface of said specimen and rotate the same and upon release of manual rotation to automatically permit inward retraction of said balls out of engagement with the specimen to permit its ready removal from said bushing.

5. In a device for releasably retaining and rotating an inner ball bearing race so as to have its outer raceway in engagement with a metering gauge for measuring the concentricity of the raceway, a casing, a rotatable shaft and a bushing mounted thereon, an adjustable spring operated brake carried by the casing to bear against said bushing to normally hold it against rotation, a driving connection between said bushing and said shaft including a set screw carried by said bushing and an enlarged coacting transverse slot in said shaft permitting a predetermined limited degree of lost motion therebetween, said bushing having an extension adapted to slidably receive said ball race and having apertures to receive balls therein to have limited radial movement therethrough, said shaft having a portion of angular cross section in engagement with said balls to constitute a cam means adapted upon manual rotation of said shaft to force said balls outwardly through said apertures into gripping relationship with the interior surface of said ball race and rotate the same and upon release of manual rotation to automatically permit retraction of said balls inwardly and out of engagement with the ball race to permit its ready removal from said bushing, the slot and the cam means on said shaft and their respective engagement with and release from the set screw and balls carried by said bushing being predetermined to be simultaneous.

JOHN J. SEME.